(12) United States Patent
Poole (10) Patent No.: US 11,169,294 B2
(45) Date of Patent: Nov. 9, 2021

(54) NARROW WINDOW MAGNETIC PROXIMITY SENSOR

(71) Applicant: Phoenix America, Inc., Fort Wayne, IN (US)

(72) Inventor: David Larry Poole, Portland, IN (US)

( * ) Notice: Subject to any disclaimer, the term of this patent is extended or adjusted under 35 U.S.C. 154(b) by 123 days.

(21) Appl. No.: 16/542,813

(22) Filed: Aug. 16, 2019

(65) Prior Publication Data

US 2021/0048549 A1 Feb. 18, 2021

(51) Int. Cl.
*G01V 3/08* (2006.01)
(52) U.S. Cl.
CPC ................................... *G01V 3/081* (2013.01)
(58) Field of Classification Search
CPC ....................................................... G01V 3/081
USPC ..................................................... 324/207.24
See application file for complete search history.

(56) References Cited

U.S. PATENT DOCUMENTS

| 3,559,124 | A  | * | 1/1971  | Posey ................ | H01H 36/0013 |
|           |    |   |         |                      | 335/205      |
| 3,716,781 | A  | * | 2/1973  | Almasi et al. ........ | G01R 33/09   |
|           |    |   |         |                      | 324/252      |
| 5,128,641 | A  | * | 7/1992  | Posey .................. | H01H 36/002  |
|           |    |   |         |                      | 335/151      |
| 6,317,048 | B1 | * | 11/2001 | Bomya ................ | B60R 21/013  |
|           |    |   |         |                      | 180/274      |
| 7,443,154 | B1 | * | 10/2008 | Merewether ........... | G01V 3/08    |
|           |    |   |         |                      | 324/67       |
| 7,508,288 | B2 | * | 3/2009  | Van Glabeke ..... | H01H 36/0013 |
|           |    |   |         |                      | 335/131      |
| 8,884,610 | B2 | * | 11/2014 | Van Veldhoven ......................... |  |
|           |    |   |         |                      | G01R 33/0035 |
|           |    |   |         |                      | 324/207.19   |
| 9,658,083 | B1 | * | 5/2017  | Posey .................... | G01B 7/023   |
| 2003/0117133 | A1 | * | 6/2003  | Miszewski ............ | E21B 47/092  |
|           |    |   |         |                      | 324/207.26   |
| 2005/0194970 | A1 | * | 9/2005  | Scheller ................. | G01V 3/081   |
|           |    |   |         |                      | 324/207.26   |
| 2006/0197523 | A1 | * | 9/2006  | Palecki .................. | G01V 3/081   |
|           |    |   |         |                      | 324/244      |
| 2008/0309327 | A1 | * | 12/2008 | Holmstrom ............ | G01B 7/003   |
|           |    |   |         |                      | 324/207.21   |
| 2009/0001972 | A1 | * | 1/2009  | Fernandez ........... | G01D 5/2451  |
|           |    |   |         |                      | 324/207.26   |
| 2009/0128139 | A1 | * | 5/2009  | Drenth ................... | G01D 5/145   |
|           |    |   |         |                      | 324/207.22   |

(Continued)

*Primary Examiner* — Christopher P McAndrew (57) ABSTRACT

A magnetic proximity sensor includes a normal magnetic field vector sensing element oriented to detect the magnetic field strength of a target magnet in a normal field vector direction. The magnetic proximity sensor also includes a transverse magnetic field vector sensing element oriented to detect the magnetic field strength of the target magnet in a transverse field vector direction. A logic circuit is connected to the normal magnetic field vector sensing element and to the transverse magnetic field vector sensing element, and is configured to indicate when both the magnetic field strength of the target magnet in the normal field vector direction is greater than a normal magnetic field vector sensing threshold and the magnetic field strength of the target magnet in the one or more transverse field vector directions is lesser than an absolute transverse magnetic field vector sensing threshold.

15 Claims, 9 Drawing Sheets
(5 of 9 Drawing Sheet(s) Filed in Color)

(56) References Cited

U.S. PATENT DOCUMENTS

| | | | |
|---|---|---|---|
| 2015/0081246 A1* | 3/2015 | Schaaf | G01D 5/145 |
| | | | 702/150 |
| 2016/0153808 A1* | 6/2016 | Pantazi | G01B 7/003 |
| | | | 324/207.21 |
| 2016/0265895 A1* | 9/2016 | Haeberle | G01B 7/14 |
| 2017/0228992 A1* | 8/2017 | Carlson | G08B 5/36 |
| 2017/0336287 A1* | 11/2017 | Wagner | F16H 61/36 |
| 2019/0079211 A1* | 3/2019 | Keene | G08B 13/24 |
| 2019/0154864 A1* | 5/2019 | Hahn | G01R 33/0011 |
| 2019/0201900 A1* | 7/2019 | Shachar | B01L 3/502761 |

* cited by examiner

NARROW WINDOW MAGNETIC PROXIMITY SENSOR

BACKGROUND

Color Drawings

The patent or application file contains at least one drawing executed in color. Copies of this patent or patent application publication with color drawings will be provided by the Office upon request and payment of the necessary fee.

Field of Invention

Embodiments of the present invention described herein generally relate to a magnetic proximity sensor for detecting the presence or absence of an object. More specifically, embodiments of the present invention described herein relate to a magnetic proximity sensor for determining whether an object is positioned within a narrow switching window. The narrow switching window may be arranged so that object must be within a relatively small target position in order for the magnetic proximity sensor to be triggered.

Related Art

Proximity sensors are used in various applications to detect the presence or absence of an object in a given position. For example, a proximity sensor may be used to sense whether a door is open or closed, or whether a machine component is in a given position. Typically, a proximity sensor is connected to an electronic control system that monitors the state of the sensor and provides logical feedback.

There are several different principles used in the design of proximity switches. The simplest form of proximity switch is a spring loaded electrical switch that is mechanically activated by the object being detected. A more sophisticated approach is based on the principle of monitoring a light beam, so that the light beam is broken or reflected when the object is present. Each type of proximity sensor has certain advantages and disadvantages. Mechanical switches are inexpensive, but may not be reliable in certain environments and/or over long term operation. Light beam, or optical, switches can be very accurate but do not work well in dirty environments that can interrupt the light source or photo-detector. Another principle often used in the design of proximity switches is magnetism. Proximity switches based on magnetic technology work well in dirty or harsh environments, but have inherent limitations in accurately detecting relatively precise positioning.

Accordingly, there is an unmet need for a proximity switch that is reliable when in dirty or harsh environments over long term operations, and that is accurate and can detect relatively precise positioning.

SUMMARY OF THE INVENTION

Embodiments of the invention described herein relate to an apparatus and method for sensing two magnetic field vectors from a single target magnet, in order to improve the sensing location accuracy of a proximity switch or sensor. Embodiments of the Narrow Window Magnetic Proximity Sensor incorporating the apparatus and method for sensing two magnetic field vectors from a single target magnet may be applied to such magnetic proximity sensors used in numerous possible applications. Such applications may include vehicles and transportation, machinery, goods production, electronics, and infrastructure, as only a few non-limiting examples. The several embodiments of the present invention presented herein illustrate the apparatus and method for sensing two magnetic field vectors from a single target magnet in linear motion applications as examples, but this is not to be construed as limiting the scope of the Narrow Window Magnetic Proximity Sensor, which may sense magnetic field vectors from multiple target magnets in sequence and/or may be used in non-linear motion applications.

Embodiments of the Narrow Window Magnetic Proximity Sensor may use magnetic field vector sensing elements that utilize the Hall Effect. The Hall Effect refers to the electric potential difference, or Hall voltage, on the opposite sides of, for example, a thin sheet of conducting or semiconducting material in the form of a "Hall bar" or a "van der Pauw element." An electric current flows through the Hall bar, creating the electric potential difference, which electric current is in turn created by a magnetic field applied perpendicular to the Hall element. Edwin Hall discovered this effect in 1879. The ratio of the voltage created to the amount of current is known as the Hall coefficient, and is a characteristic of the material of which the element is composed. Hall Effect devices, then, are digital on/off sensors constructed of, for example, semiconductor material used to sense the presence of magnetic fields using the Hall Effect. In brushless servomotors, for non-limiting example, they are used to provide position feedback when six-step commutation is employed.

Alternatively, embodiments of the Narrow Window Magnetic Proximity Sensor may use magnetic field vector sensing elements that utilize magneto resistive materials. Magneto resistivity refers to the tendency of a material to change the value of its electrical resistance in an externally applied magnetic field. Still alternatively, embodiments of the Narrow Window Magnetic Proximity Sensor may use magnetic field vector sensing elements that utilize both the Hall Effect and magneto resistance, together or in combination.

Known magnetic proximity sensors sense magnetic field strength only in the normal field vector direction. The term "normal" as used in the context of the present invention refers to being perpendicular, in this case being perpendicular to the magnetic pole face. As a magnetic proximity sensor passes through the magnetic field with the magnetic field vector sensing element perpendicular to the magnetic field lines, the sensed field strength increases to a maximum and then decreases in an approximate Bell curve. The switching window, then, is defined by threshold values of sensed field strength. Because the increase and decrease of the field strength experienced by the magnetic field vector sensing element occurs relatively gradually, the magnetic proximity sensor has a relatively wide switching window as it moves past the magnet.

Embodiments of the present invention, however, orient at least one magnetic field vector sensing element to sense the magnetic field strength of the target magnet in the transverse, or perpendicular to normal, field vector direction. In this configuration, as the at least one magnetic field vector sensing element passes over the target magnet, or as the target magnet passes beneath the at least one magnetic field vector sensing element, the sensed field strength initially increases in magnitude, but then decreases in magnitude and briefly goes to zero, before increasing in magnitude with the opposite polarity. The rate of change of the sensed field strength is at its greatest as the sensed field strength crosses zero, or at the point where it reverses polarity, which is at the center point of the target magnet. As a result, the magnitude of the sensed field strength very quickly crosses below a given threshold, crosses zero, and then very quickly crosses to above another given threshold in the opposite polarity. This means that the magnetic proximity sensor using a magnetic field vector sensing element that senses the magnetic field strength of the target magnet in the transverse field vector direction may be configured with a narrow switching window. This is accomplished by defining the switching window as that which falls between minimum positive and negative thresholds of magnetic field strength with the magnetic field vector sensing element oriented to sense the magnetic field strength of the target magnet in the transverse field vector direction.

Defining the switching window in this way presents a particular issue which is also addressed by the present invention. Specifically, while the switching window being defined as that which falls between minimum positive and negative thresholds of sensed magnetic field strength results in a narrow switching window, the condition of the sensed magnetic field strength falling below these thresholds is also met when the magnetic proximity sensor is outside of the magnetic field of the target magnet entirely. In order to prevent a false positive position indication, therefore, embodiments of the present invention use both a magnetic field vector sensing element that senses the magnetic field strength of the target magnet in the transverse field vector direction and a magnetic field vector sensing element that senses the magnetic field strength of the target magnet in the normal field vector direction. The magnetic field vector sensing element that senses the magnetic field strength of the target magnet in the normal field vector direction is used to determine whether the magnetic proximity sensor is within the magnetic field of the target magnet. Only if the magnetic proximity sensor is in fact within the magnetic field of the target magnet, then the magnetic field vector sensing element that senses the magnetic field strength of the target magnet in the transverse field vector direction is used to determine whether the magnetic proximity sensor is within the switching window defined as that which falls between minimum positive and negative thresholds of magnetic field strength in the transverse direction.

More specifically, a logic circuit combines the output of the magnetic field vector sensing element that senses the magnetic field strength of the target magnet in the normal field vector direction and the output of the magnetic field vector sensing element that senses the magnetic field strength of the target magnet in the transverse field vector direction, so that only when the magnetic field vector sensing element that senses the magnetic field strength of the target magnet in the normal field vector direction is "high" or "on" and the magnetic field vector sensing element that senses the magnetic field strength of the target magnet in the transverse field vector direction is "low" or "off" then the output of the logic circuit is "high" or "on." In this way, the magnetic proximity sensor only gives a positive result when it is both within the magnetic field of the target magnet and within the narrow switching window defined as that which falls between minimum positive and negative thresholds of magnetic field strength in the transverse direction. The resulting narrow switching window can, in some embodiments of the present invention, be altered by changing the minimum positive and negative thresholds of magnetic field strength in the transverse direction. This may be accomplished by way of adjusting the sensitivity of the magnetic field vector sensing element that senses the magnetic field strength of the target magnet in the transverse field vector direction.

According to one embodiment of the Narrow Window Magnetic Proximity Sensor, a magnetic proximity sensor includes a normal magnetic field vector sensing element oriented to detect the magnetic field strength of a target magnet in a normal field vector direction. The magnetic proximity sensor also includes one or more transverse magnetic field vector sensing elements oriented to detect the magnetic field strength of the target magnet in one or more transverse field vector directions. A logic circuit is connected to the normal magnetic field vector sensing element and to the at least one transverse magnetic field vector sensing element. The logic circuit is configured to indicate when both the magnetic field strength of the target magnet in the normal field vector direction is greater than a normal magnetic field vector sensing threshold and the magnetic field strength of the target magnet in the one or more transverse field vector directions is lesser than an absolute transverse magnetic field vector sensing threshold.

According to another embodiment of the Narrow Window Magnetic Proximity Sensor, an apparatus has a magnetic proximity sensor. The apparatus has a target magnet attached to a movable object. The magnetic proximity sensor of the apparatus has a normal magnetic field vector sensing element oriented to detect the magnetic field strength of the target magnet in a normal field vector direction. The magnetic proximity sensor of the apparatus also has one or more transverse magnetic field vector sensing elements oriented to detect the magnetic field strength of the target magnet in one or more transverse field vector directions. A logic circuit is connected to the normal magnetic field vector sensing element and to the one or more transverse magnetic field vector sensing elements. The logic circuit is configured to indicate when both the magnetic field strength of the target magnet in the normal field vector direction is greater than a normal magnetic field vector sensing threshold and the magnetic field strength of the target magnet in the one or more transverse field vector directions is lesser than an absolute transverse magnetic field vector sensing threshold.

According to another embodiment of the Narrow Window Magnetic Proximity Sensor, a method of determining the proximity of an object to a sensor includes several steps. The first step is attaching a target magnet to the object. The second step is orienting a normal magnetic field vector sensing element to detect the magnetic field strength of the target magnet in a normal field vector direction using the Hall Effect or magneto resistivity. The third step is orienting a transverse magnetic field vector sensing element to detect the magnetic field strength of the target magnet in a transverse field vector direction using the Hall Effect or magneto resistivity. The fourth step is connecting a logic circuit to the normal magnetic field vector sensing element and to the transverse magnetic field vector sensing element. The fifth step is configuring the logic circuit to indicate when both the magnetic field strength of the target magnet in the normal field vector direction is greater than a normal magnetic field vector sensing threshold and the magnetic field strength of the target magnet in the transverse field vector direction is lesser than an absolute transverse magnetic field vector sensing threshold.

One purpose of the present disclosure is to provide a novel approach to the design and use of magnetic proximity sensors that significantly improves the location accuracy compared to existing methods.

BRIEF DESCRIPTION OF THE DRAWINGS

The above-mentioned and other features of embodiments of the Narrow Window Magnetic Proximity Sensor, and the manner of their working, will become more apparent and will be better understood by reference to the following description of embodiments of the Narrow Window Magnetic Proximity Sensor taken in conjunction with the accompanying drawings, wherein.

Corresponding reference numbers indicate corresponding parts throughout the several views. The exemplifications set out herein illustrate embodiments of the Narrow Window Magnetic Proximity Sensor, and such exemplifications are not to be construed as limiting the scope of the claims in any manner.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention or claims in any manner. In respect of the methods disclosed and illustrated, the steps presented are exemplary in nature, and thus, the order of the steps is not necessary or critical.

Figure 1:
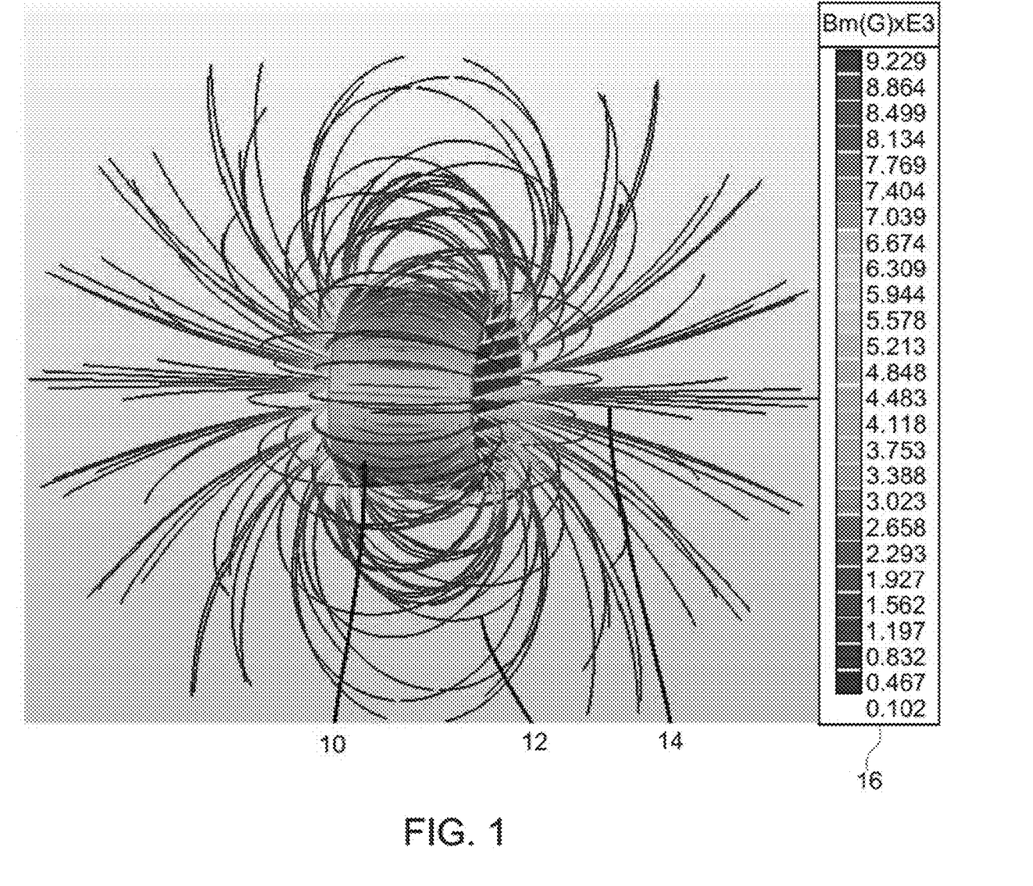
FIG. 1 is a perspective view of a magnetic field of a known target magnet, as described herein.

Referring now to FIG. 1, a perspective view of an embodiment of a target magnet 10 is shown. The target magnet 10 produces a magnetic field 12, which is represented by streamlines 14 representing the magnetic vector direction with the color of the streamlines 14 representing the magnetic field strength in Gauss "G"×$10^3$ in that vector. FIG. 1 illustrates how a magnet fundamentally produces a wide-area field as compared, for example, to a light beam. The breadth of the magnetic field 12 makes it difficult to accurately sense small movements relative to the size of the magnet.

Figure 2A:
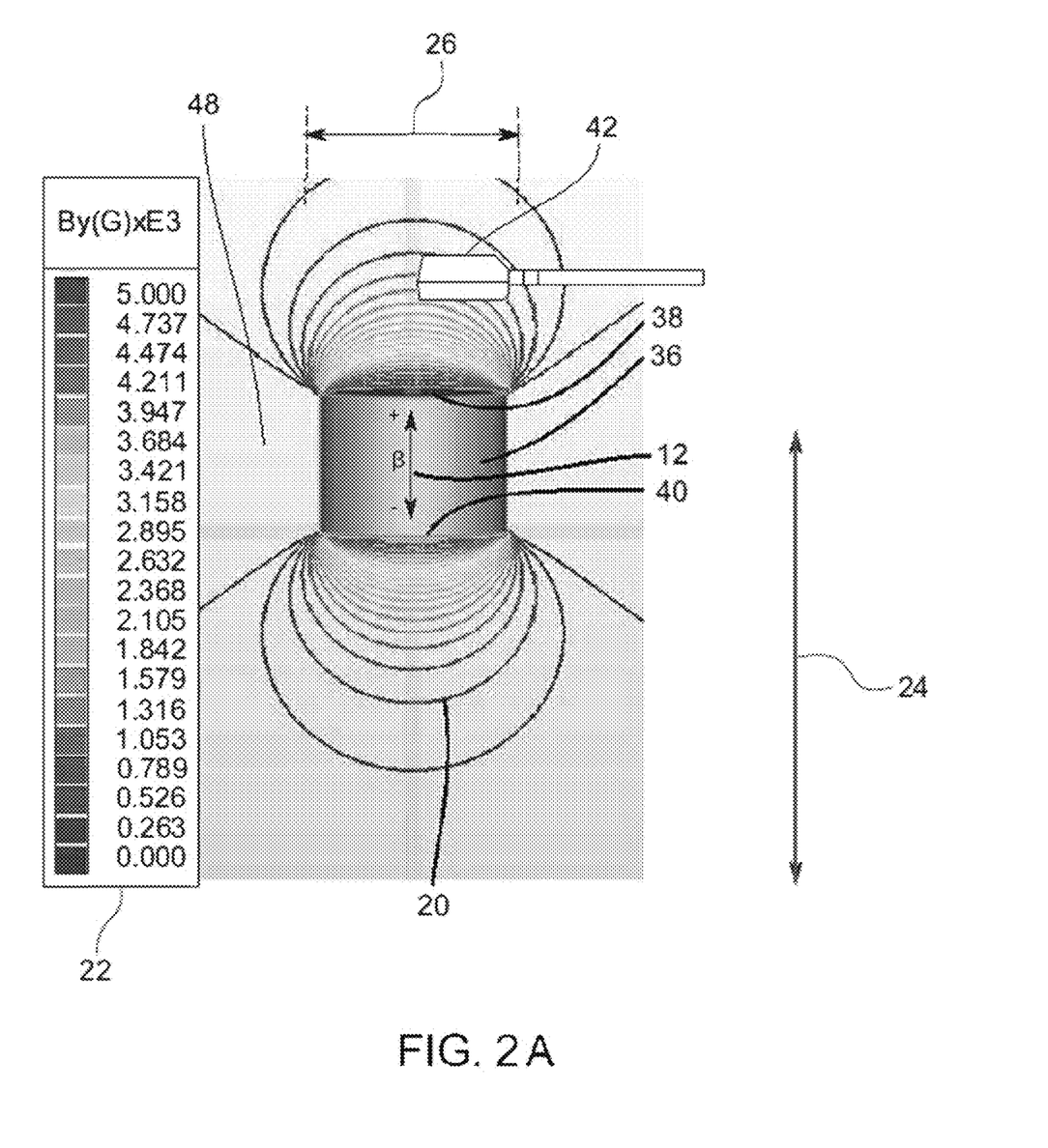
FIGS. 2A and 2B are graphical representations of exemplary magnetic field strengths in the normal vector directions from the positive pole and negative pole faces of a round "button" magnet used with a magnetic proximity sensor, and a sensor oriented to detect the magnetic field in the normal field vector direction, as described herein.
Figure 2B:
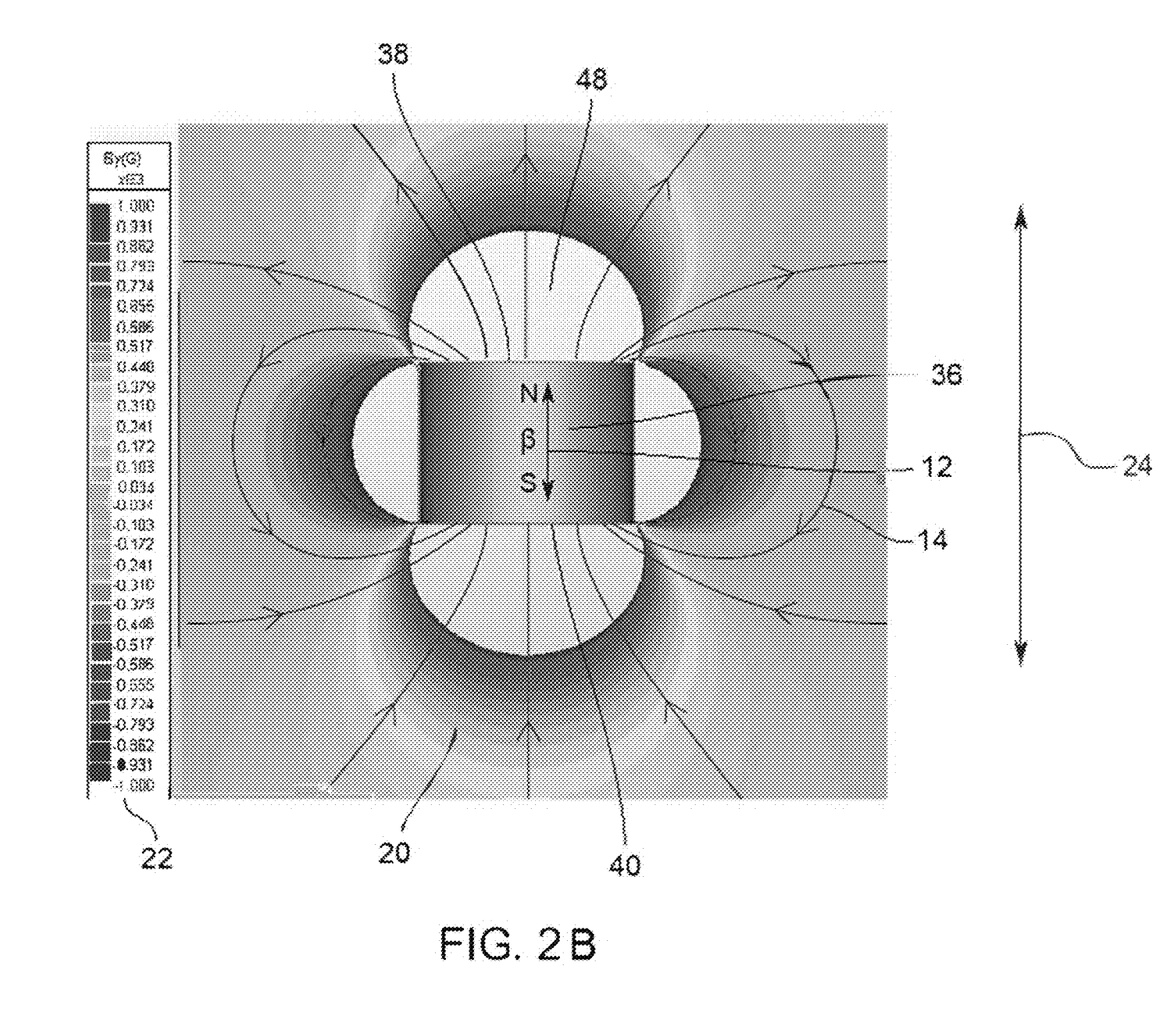

Turning now to FIGS. 2A and 2B, illustrations of magnetic field 12 (β) strength 22 in the normal field vector direction 24 are shown. Isomagnetic field intensity lines or gradations 20 (not to be confused with magnetic field lines 14) in the normal field vector direction 24 extend from the positive pole face 38 and negative pole face 40 of a round "button" magnet 36, which represents an embodiment of the target magnet of the magnetic proximity sensor of the present invention. The color of the isomagnetic field intensity lines or gradations 20 represents the magnetic field strength in Gauss "G"×$10^3$. It is noted that, in order to provide greater clarity in the area of pertinent magnetic field 12 strength 22, isomagnetic field intensity lines or gradations 20 are not shown in areas 48 where the magnetic field 12 strength 22 exceeds the pertinent switching range. As shown in FIG. 2A, Hall Effect or magneto resistive sensor 42 is oriented to detect the magnetic field strength 22 in the normal field vector direction 24, thereby creating a wide switching window 26 as the round "button" magnet 36 moves past the hall effect or magneto resistive sensor 42.

Figure 3A:
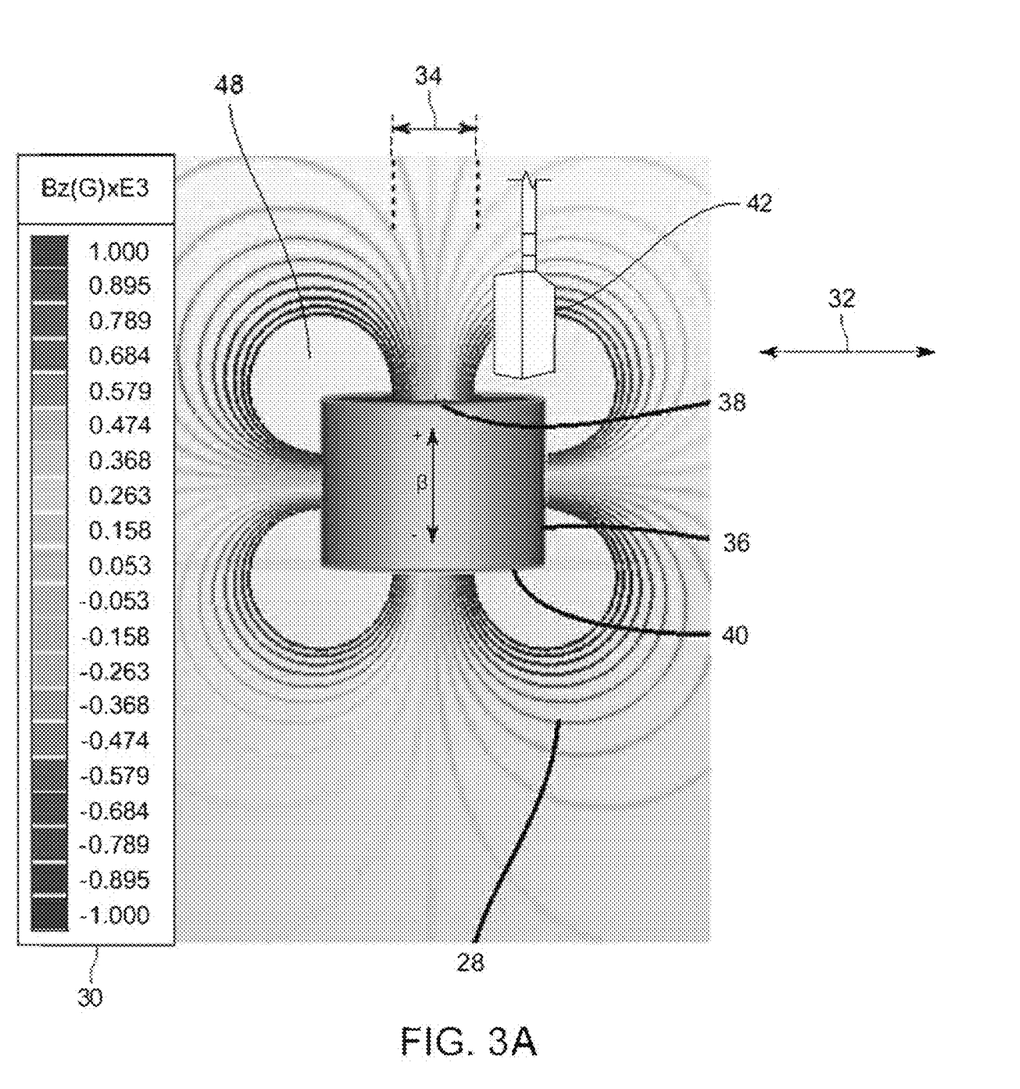
FIGS. 3A and 3B are graphical representations of exemplary magnetic field strengths in the transverse vector directions from the positive pole and negative pole faces of a round "button" magnet used with a magnetic proximity sensor, and a sensor oriented to detect the magnetic field in the transverse field vector direction, as described herein.
Figure 3B:
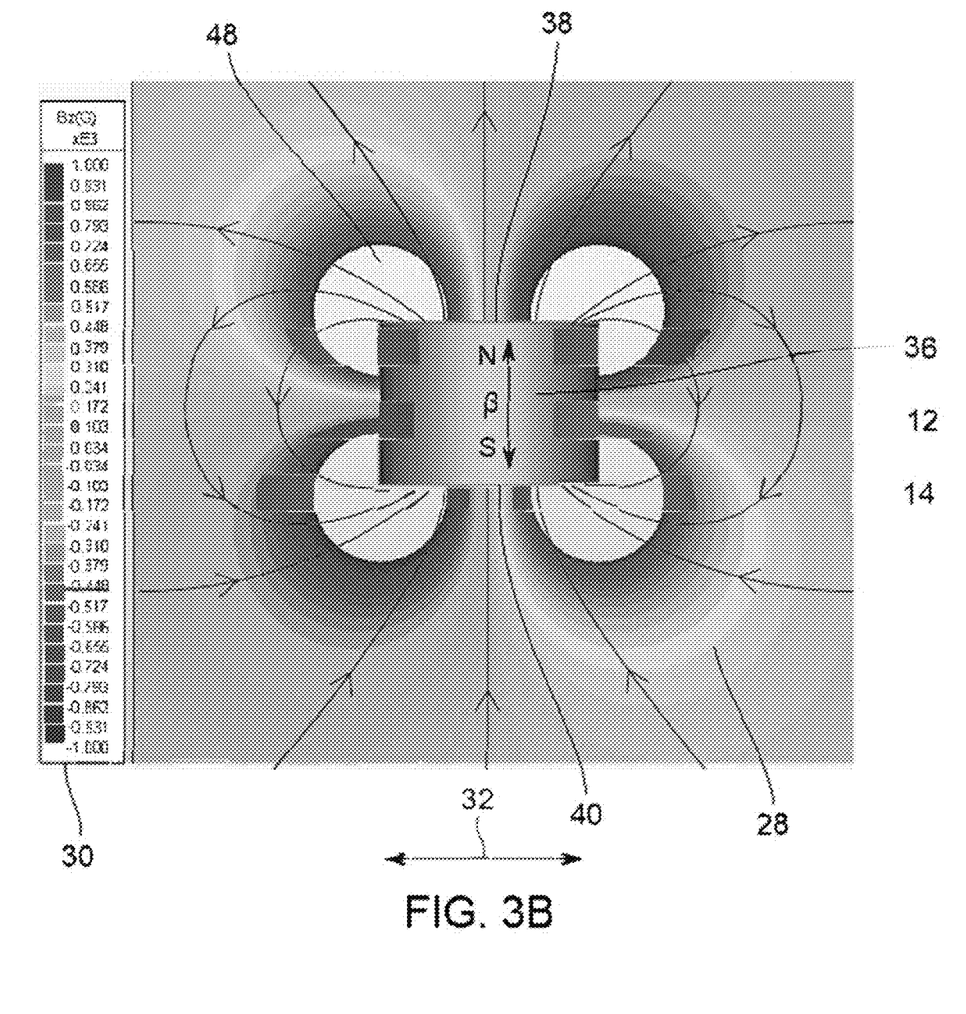

Turning now to FIGS. 3A and 3B, illustrations of magnetic field 12 (β) strength 30 in the transverse field vector direction 32 are shown. Isomagnetic field intensity lines or gradations 28 (again not to be confused with magnetic field lines 14) in the transverse field vector direction 32 extend from the positive pole face 38 and negative pole face 40 of a round "button" magnet 36, which again represents an embodiment of the target magnet of the magnetic proximity sensor of the present invention. It is again noted that, in order to provide greater clarity in the area of pertinent magnetic field 12 strength 22, isomagnetic field intensity lines or gradations 20 are again not shown in areas 48 where the magnetic field 12 strength 22 exceeds the pertinent switching range. The color of the isomagnetic field intensity lines or gradations 28 again represents the magnetic field strength in Gauss "G"×$10^3$. As shown in FIG. 3A, Hall Effect or magneto resistive sensor 42 is oriented to detect the magnetic field strength 30 in the transverse field vector direction 32, thereby creating a narrow switching window 34 as the round "button" magnet 36 moves past the hall effect or magneto resistive sensor 42.

Figures 2C, 3C:
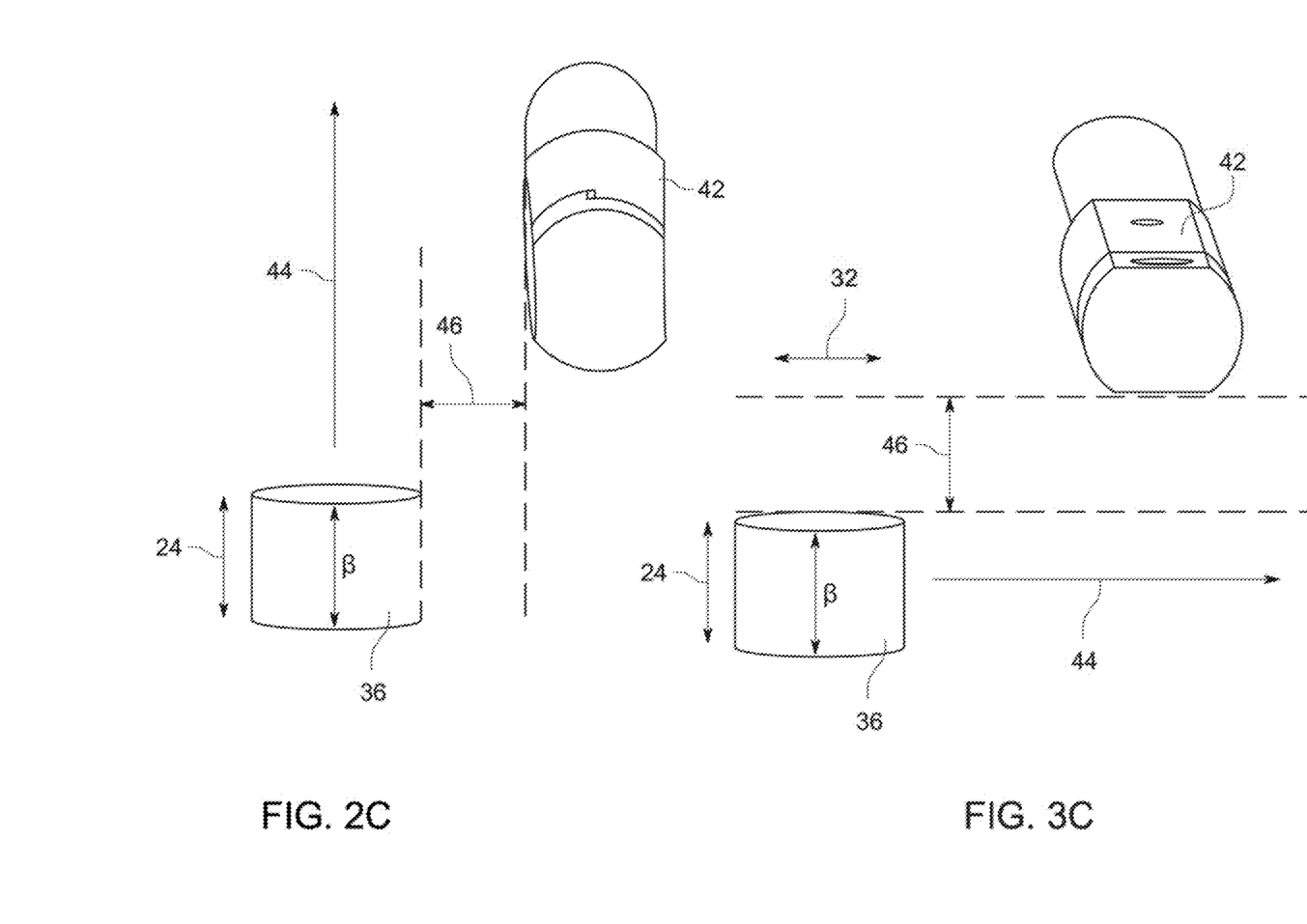
FIG. 2C is an isometric plan view of a sensor oriented to detect a magnetic field in the normal field vector direction, and a target round "button" magnet arranged to move parallel to its magnetic field relative to the sensor, as described herein.
FIG. 3C is an isometric plan view of a sensor oriented to detect a magnetic field in the transverse field vector direction, and a target round "button" magnet arranged to move perpendicular to its magnetic field relative to the sensor, as described herein.

FIG. 2C shows a Hall Effect or magneto resistive sensor 42 oriented to detect the magnetic field of a round "button" magnet 36 in the normal field vector direction 24 of magnetic field β. The round "button" magnet 36 moves past the Hall Effect or magneto resistive sensor 42, or vice versa, in a travel direction 44 parallel to its normal field vector direction 24 of magnetic field β. The round "button" magnet 36 is separated from the Hall Effect or magneto resistive sensor 42 by a fixed air gap 46. Similarly, FIG. 3C shows a Hall Effect or magneto resistive sensor 42 oriented to detect the magnetic field of a round "button" magnet 36 in the transverse field vector direction 32 of magnetic field β. The round "button" magnet 36 moves past the Hall Effect or magneto resistive sensor 42, or vice versa, in a travel direction 44 perpendicular to its normal field vector direction 24 of magnetic field β. The round "button" magnet 36 is again separated from the Hall Effect or magneto resistive sensor 42 by a fixed air gap 46.

Figure 4:
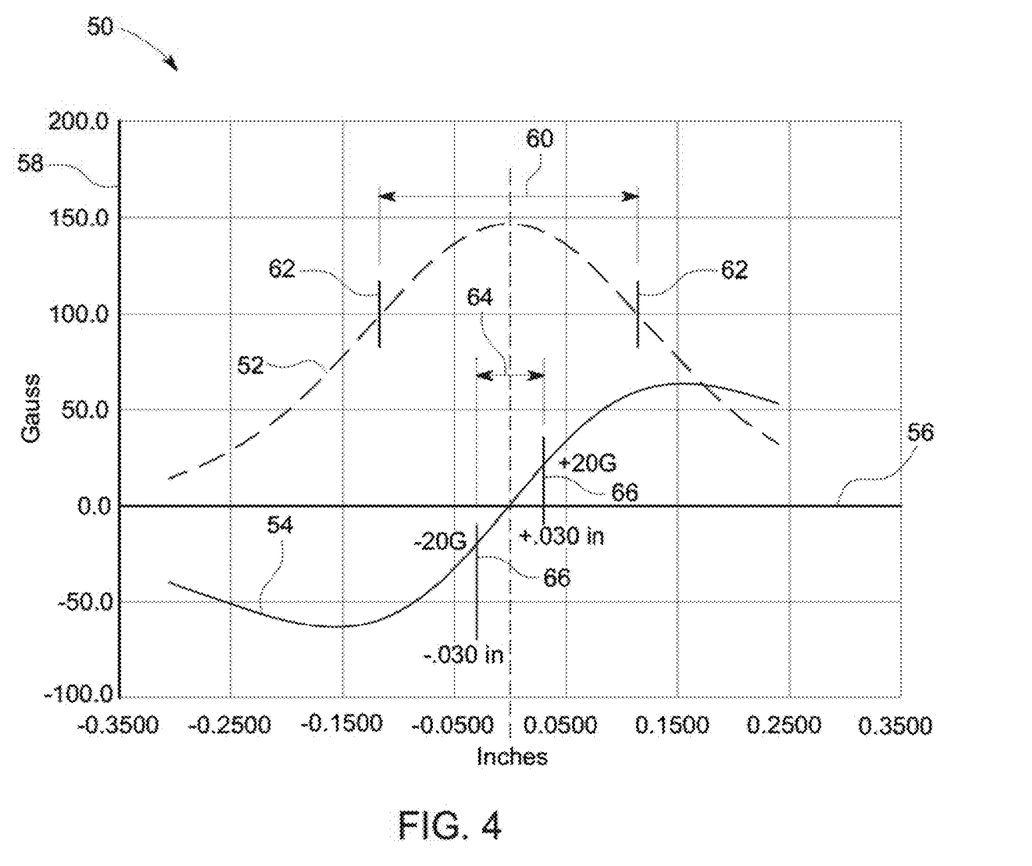
FIG. 4 is a two dimensional graph of the field strength experienced by a sensor oriented to detect the magnetic field in the normal field vector direction, and of the field strength experienced by a sensor oriented to detect the magnetic field in the transverse field vector direction, as both sensors pass by a magnet, as described herein.

FIG. 4 shows a two dimensional field plot 50 of field strength experienced by a magnetic proximity sensor having a normal magnetic field vector sensing element and a transverse magnetic field vector sensing element as it passes by a target magnet separated by a fixed air gap, or as the target magnetic passes by the magnetic proximity sensor. Each or either of the normal magnetic field vector sensing element and the transverse magnetic field vector sensing element may be Hall Effect or magneto resistive sensors as shown in the previous figures. Also, the normal magnetic field vector sensing element may be further embodied as a simple reed switch. The X axis 56 of the two dimensional field plot 50 represents transverse distance in inches (in). The Y axis 58 of the two dimensional field plot 50 represents field strength in Gauss (G), or alternately field strength in magnetic flux density. The field strength in the normal field vector direction sensed by the normal magnetic field vector sensing element is represented by normal field line 52. The field strength in the transverse field vector direction sensed by the transverse magnetic field vector sensing element is represented by transverse field line 54.

As the magnetic proximity sensor approaches the target magnet, or as the target magnet approaches the magnetic proximity sensor, as the case may be, the field strength sensed by the normal magnetic field vector sensing element increases to a maximum directly above the target magnet. In so doing, the normal field line 52 crosses above a normal magnetic field vector sensing element sensing threshold 62, increases to its maximum, and then crosses back below the normal magnetic field vector sensing element sensing threshold 62. The distance between the normal magnetic field vector sensing element sensing thresholds 62, then, defines the normal magnetic field vector sensing element switching window 60, within which the output of the normal magnetic field vector sensing element is "high" or "on."

Meanwhile, as the magnetic proximity sensor approaches the target magnet, or as the target magnet approaches the magnetic proximity sensor, the field strength sensed by the transverse magnetic field vector sensing element initially increases in absolute magnitude, in this case in the negative direction, before rapidly decreasing in magnitude to zero and then increasing in magnitude in the opposite direction. In so doing, the transverse field line 54 crosses beneath an absolute transverse magnetic field vector sensing element sensing threshold 66, before crossing zero and then crossing above the absolute transverse magnetic field vector sensing element sensing threshold 66 in the opposite direction. The distance between the transverse magnetic field vector sensing element sensing thresholds 66, then, defines the transverse magnetic field vector sensing element switching window 64, within which the output of the transverse magnetic field vector sensing element is "low" or "off."

As noted previously, the magnetic field vector sensing element that senses the magnetic field strength of the target magnet in the normal field vector direction, as represented in FIG. 4 as normal field line 52, is used to determine whether the magnetic proximity sensor is within the magnetic field of the target magnet, defined as the normal magnetic field vector sensing element switching window 60 which falls between the normal magnetic field vector sensing element sensing thresholds 62. Only if the magnetic proximity sensor is in fact within the magnetic field of the target magnet, then the magnetic field vector sensing element that senses the magnetic field strength of the target magnet in the transverse field vector direction, as represented in FIG. 4 as transverse field line 54, is used to determine whether the magnetic proximity sensor is within the transverse magnetic field vector sensing element switching window 64 defined as that which falls between the transverse magnetic field vector sensing element sensing thresholds 66.

The transverse magnetic field vector sensing element sensing thresholds 66 are here set at plus or minus about 20 Gauss, which gives a transverse magnetic field vector sensing element switching window 64 of plus or minus 0.030 inches, as a non-limiting example. This may be significantly smaller than the diameter of the target magnet, which may be about 0.200 inches. This narrow switching window is not achievable with known proximity sensors on the market.

It is here noted that the Hall Effect or magneto resistive sensor 42 oriented to detect the magnetic field strength 22 in the normal field vector direction 24 may be oriented as shown in FIG. 2A, so that the relative motion between the Hall Effect or magneto resistive sensor 42 and the target magnet 36 is perpendicular to the magnetic field 12 and parallel to the positive pole face 38, or perpendicular to the magnetic field 12 and parallel to the negative pole face 40. Similarly, the Hall Effect or magneto resistive sensor 42 oriented to detect the magnetic field strength 22 in the transverse field vector direction 32 may be oriented as shown in FIG. 3A, so that the relative motion between the Hall Effect or magneto resistive sensor 42 and the target magnet 36 is again perpendicular to the magnetic field 12 and parallel to the positive pole face 38, or perpendicular to the magnetic field 12 and parallel to the negative pole face 40.

Alternately, the relative motion between the Hall Effect or magneto resistive sensor 42 and the target magnet 36 may be parallel with the magnetic field 12 and perpendicular to the positive pole face 38 and negative pole face 40. In this case, the resultant field strength in the normal field vector direction sensed by the normal magnetic field vector sensing element as represented by normal field line 52 in FIG. 4 would be reversed in polarity. Similarly, the field strength in the transverse field vector direction sensed by the transverse magnetic field vector sensing element as represented by transverse field line 54 would also be reversed in polarity.

Figure 5:
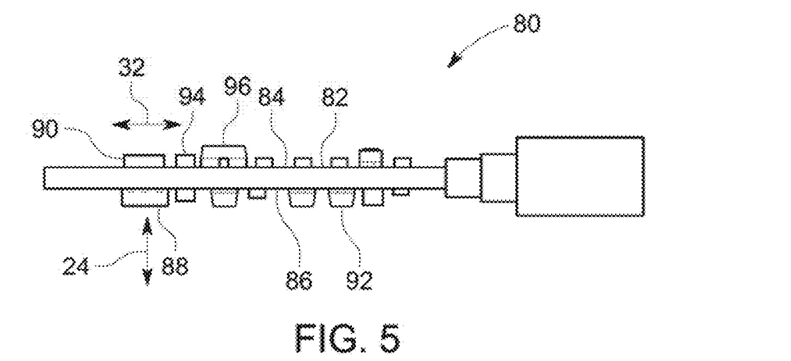
FIG. 5 is a side view of an embodiment of the Narrow Window Magnetic Proximity Sensor, as described herein.

Turning now to FIG. 5, an exemplary embodiment of a magnetic proximity sensor 80 according to the present invention is shown having a normal magnetic field vector sensing element 88 on the bottom side 86 of a printed circuit board (PCB) 82, and a transverse magnetic field vector sensing element 90 on the top side 84 of the PCB 82. The normal magnetic field vector sensing element 88 may in one embodiment of the magnetic proximity sensor 80 be a Hall Effect sensor, while the transverse magnetic field vector sensing element 90 may be a magneto resistive sensor. It is contemplated that another embodiment of the magnetic proximity sensor 80 may have the normal magnetic field vector sensing element 88 on the top side 84 of the PCB 82, and the transverse magnetic field vector sensing element 90 on the bottom side 86 of the PCB 82. The magnetic proximity sensor 80 is provided with a voltage regulation and protection circuit 92, a filtering circuit 94, and a logic circuit 96. As before, the normal magnetic field vector sensing element 88 is used to determine whether the magnetic proximity sensor is within the magnetic field of the target magnet, and the transverse magnetic field vector sensing element 90 is used determine whether the magnetic proximity sensor 80 is within the transverse magnetic field vector sensing element switching window.

Figure 6:
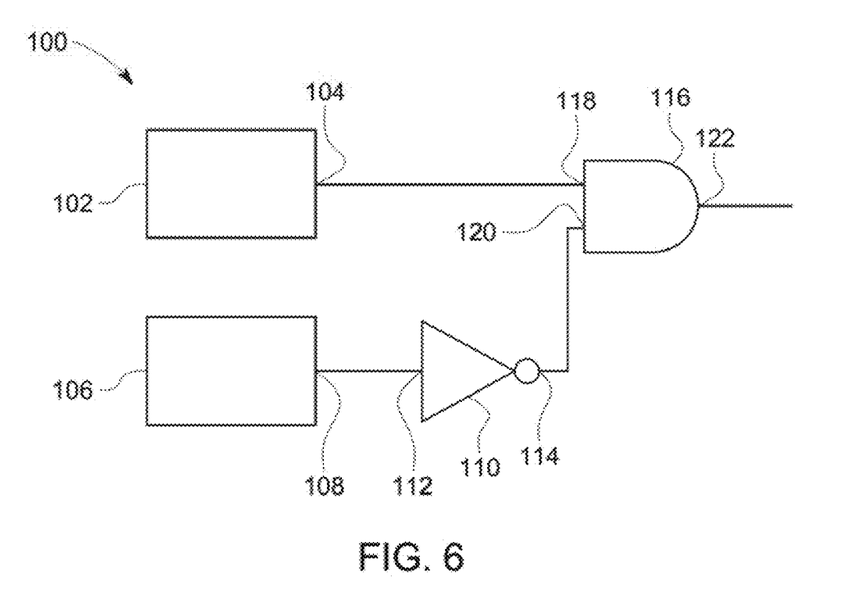
FIG. 6 is a logic diagram used in an embodiment of the Narrow Window Magnetic Proximity Sensor, as described herein.

Turning now to FIG. 6, an embodiment of a logic circuit according to the present invention is represented in a logic diagram 100. The logic diagram 100 includes the normal magnetic field vector sensing element 102 and the transverse magnetic field vector sensing element 106. The normal magnetic field vector sensing element 102 has a normal magnetic field vector sensing element output 104, which is "high" or "on" when the normal magnetic field vector sensing element 102 is within the normal magnetic field vector sensing element switching window defined by the normal magnetic field vector sensing element sensing thresholds. The transverse magnetic field vector sensing element 106 has a transverse magnetic field vector sensing element output 108, which is "low" or "off" when the transverse magnetic field vector sensing element 106 is within the transverse magnetic field vector sensing element switching window defined by the transverse magnetic field vector sensing element absolute sensing thresholds.

The transverse magnetic field vector sensing element output 108 is in electrical communication with an inverter/NOT gate input 112 of an inverter/NOT gate 110, so that when the transverse magnetic field vector sensing element output 108 is "high" or "on," the inverter/NOT gate input 112 is "high" or "on," and vice versa. When the inverter/NOT gate input 112 of the inverter/NOT gate 110 is "high" or "on," an inverter/NOT gate output 114 of the inverter/NOT gate 110 is "low" or "off." Conversely, when the inverter/NOT gate input 112 of the inverter/NOT gate 110 is "low" or "off," the inverter/NOT gate output 114 of the inverter/NOT gate 110 is "high" or "on."

The normal magnetic field vector sensing element output 104 of the normal magnetic field vector sensing element 102 is in electrical communication with an AND gate first input 118 of an AND gate 116, so that when the normal magnetic field vector sensing element output 104 is "high" or "on," the AND gate first input 118 is "high" or "on," and vice versa. The inverter/NOT gate output 114 of the inverter/NOT gate 110 is in electrical communication with an AND gate second input 120 of the AND gate 116, so that when the inverter/NOT gate output 114 is "high" or "on," the AND gate second input 120 is "high" or "on," and vice versa.

Only when both the AND gate first input 118 is "high" or "on" and the AND gate second input 120 is "high" or "on," an AND gate output 122 is "high" or "on." If either the AND gate first input 118 is "low" or "off" or the AND gate second input 120 is "low" or "off," the AND gate output 122 is "low" or "off." In this way, the magnetic proximity sensor 80 only gives a "high" or "on" signal when the normal magnetic field vector sensing element 102 is within the magnetic field of the target magnet, and the transverse magnetic field vector sensing element 106 is within the transverse magnetic field vector sensing element switching window.

Figure 7:
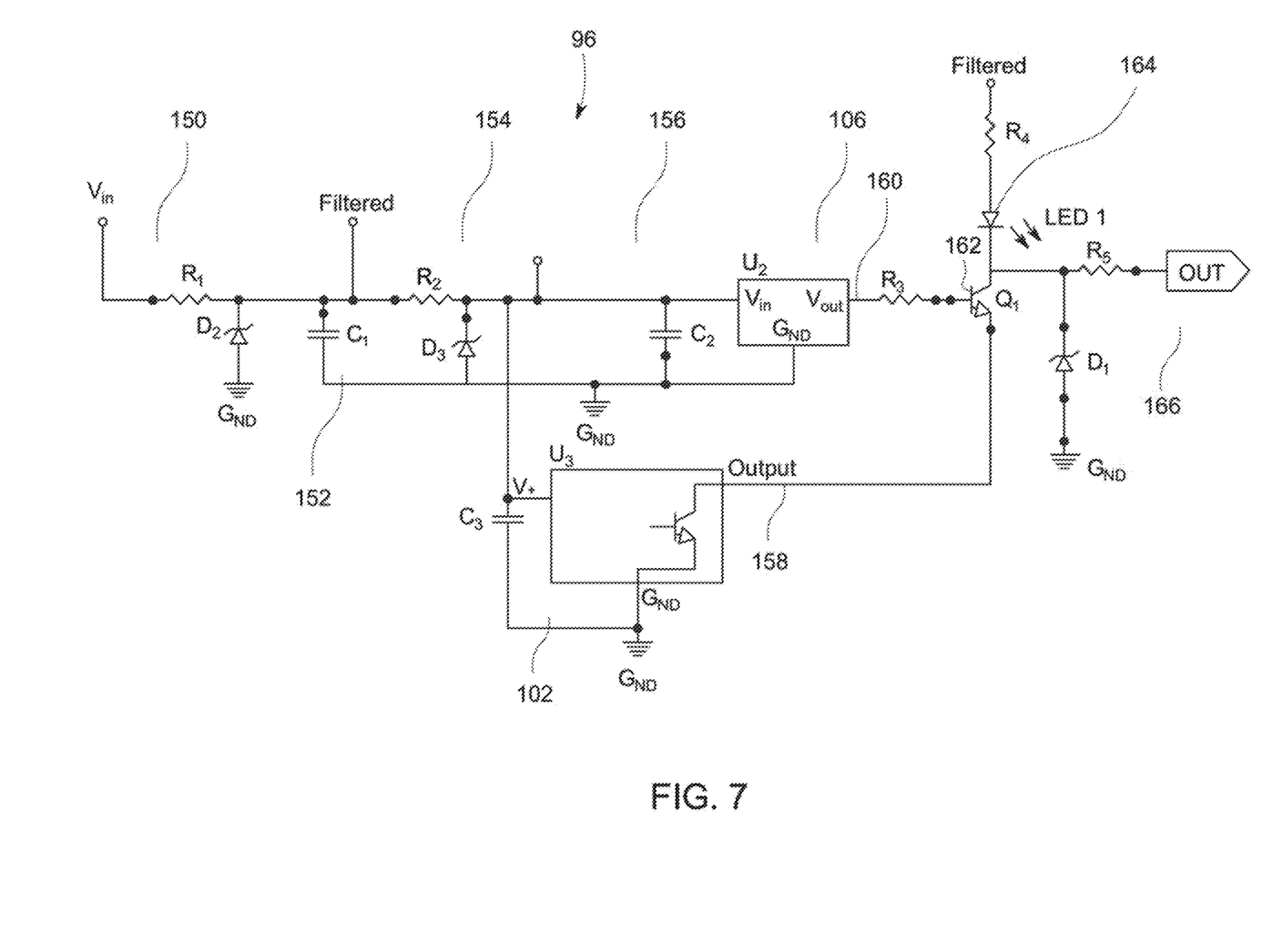
FIG. 7 is a logic circuit used in an embodiment of the Narrow Window Magnetic Proximity Sensor, as described herein.

FIG. 7 shows another embodiment of a logic circuit 96 that may be used as part of the Narrow Window Magnetic Proximity Sensor. The logic circuit 96 in the embodiment of the present invention shown in FIG. 7 takes advantage of an open collector output 158 in the normal magnetic field vector sensing element 102. The logic circuit 96 may include a first voltage regulator 150, which may regulate input voltage to 24 volts, as a non-limiting example. The first voltage regulator 150 may be connected to a first filter circuit 152. The first filter circuit 152 may be connected to a second voltage regulator 154, which may regulate the voltage further to 3.3 volts, as a non-limiting example. The second voltage regulator 154 may be connected to a second filter circuit 156. The first voltage regulator 150, the first filter circuit 152, the second voltage regulator 154, and the second filter circuit 156 then supply power to the normal magnetic field vector sensing element 102 and to the transverse magnetic field vector sensing element 106.

When the normal magnetic field vector sensing element 102 is positioned relative to the target magnet so that the sensed magnetic field strength in the normal vector direction is below the normal magnetic field vector sensing element sensing threshold, the open collector output 158 of the normal magnetic field vector sensing element 102 is open. When the normal magnetic field vector sensing element 102 is positioned relative to the target magnet so that the sensed magnetic field strength in the normal vector direction is above the normal magnetic field vector sensing element sensing threshold, the open collector output 158 of the normal magnetic field vector sensing element 102 is closed. When the transverse magnetic field vector sensing element 106 is positioned relative to the target magnet so that the sensed magnetic field strength in the in the transverse vector direction is above the transverse magnetic field vector sensing element sensing threshold, the output 160 of the transverse magnetic field vector sensing element 106 is low, i.e.—active low. When the transverse magnetic field vector sensing element 106 is positioned relative to the target magnet so that the sensed magnetic field strength in the in the transverse vector direction is below the transverse magnetic field vector sensing element sensing threshold, the output 160 of the transverse magnetic field vector sensing element 106 is high.

When the output 160 of the transverse magnetic field vector sensing element 106 is high, transistor switch 162 is turned on. Therefore, only when the normal magnetic field vector sensing element 102 is positioned relative to the target magnet so that the sensed magnetic field strength in the normal vector direction is above the normal magnetic field vector sensing element sensing threshold and the open collector output 158 of the normal magnetic field vector sensing element 102 is closed, and the transverse magnetic field vector sensing element 106 is positioned relative to the target magnet so that the sensed magnetic field strength in the in the transverse vector direction is below the transverse magnetic field vector sensing element sensing threshold and the output 160 of the transverse magnetic field vector sensing element 106 is high, is the circuit including the Light Emitting Diode (LED) 164 closed to ground, allowing current to flow through the LED 164. The circuit including the LED 164 may further be provided with a third voltage regulator 166, which may be set to 24V, as a non-limiting example.

It is noted that the embodiment of the present invention shown in FIG. 7 contemplates that the normal magnetic field vector sensing element 102 uses a Hall Effect sensor, whereas the transverse magnetic field vector sensing element 106 uses a magneto resistive sensor. However, it is contemplated as being within the scope of the present invention that the transverse magnetic field vector sensing element 106 may be a Hall Effect sensor or a magneto resistive sensor, and that the normal magnetic field vector sensing element 102 may be a Hall Effect sensor, a magneto resistive sensor, or a simple reed switch. It is further noted that the embodiment of the present invention shown in FIGS. 5 and 7 show the normal magnetic field vector sensing element 88 or 102 and the transverse magnetic field vector sensing element 90 or 106 as separate elements. However, it is contemplated that the normal magnetic field vector sensing element 88 or 102 and the transverse magnetic field vector sensing element 90 or 106 may be integrated into a single Integrated Circuit.

It is further within the scope of embodiments of the present invention that the logic circuit 96 may consider the slope of the normal field line 52 and/or the slope of the transverse field line 54, and/or rate of change of slope of the normal field line 52 and/or the rate of change of the slope of the transverse field line 54, in order to determine whether the magnetic proximity sensor 80 is approaching the normal magnetic field vector sensing element switching window 60 and/or the transverse field vector sensing element switching window 64, and/or in which direction from the present location of the magnetic proximity sensor 80 the normal magnetic field vector sensing element switching window 60 and/or the transverse field vector sensing element switching window 64 is located.

It is further contemplated that in some embodiments of the present invention, the target magnet may move in a linear path relative to the magnetic proximity sensor 80, or vice versa, whereas in other embodiments of the present invention, the target magnet may move in a curvilinear path relative to the magnetic proximity sensor 80, or vice versa, so that the normal magnetic field vector sensing element 88 and the transverse magnetic field vector sensing element 90 may sense whether the target magnet is within a narrow linear or curvilinear window, by way of suitable adjustment of the normal magnetic field vector sensing element sensing thresholds 62 and transverse magnetic field vector sensing element sensing thresholds 66.

It is further contemplated that in other embodiments of the present invention, the magnetic proximity sensor 80 may sense whether the target magnet is within a small area on the surface of a plane, cylinder, or sphere, which may be accomplished by way of the use of a second transverse magnetic field vector sensing element perpendicular to the first transverse magnetic field vector sensing element. In such an embodiment, in addition to using a magnetic field vector sensing element that senses the magnetic field strength of the target magnet in the normal field vector direction to determine whether the magnetic proximity sensor is within the magnetic field of the target magnet, and in addition to using one magnetic field vector sensing element that senses the magnetic field strength of the target magnet in one transverse field vector direction to determine whether the magnetic proximity sensor is within one transverse magnetic field vector sensing element switching window, one or more additional magnetic field vector sensing elements that sense the magnetic field strength of the target magnet in one or more additional transverse field vector directions may be used to determine whether the magnetic proximity sensor is within one or more additional transverse magnetic field vector sensing element switching windows, perpendicular or otherwise to the first transverse magnetic field vector sensing element switching window.

While the Narrow Window Magnetic Proximity Sensor has been described with respect to at least one embodiment, the Narrow Window Magnetic Proximity Sensor can be further modified within the spirit and scope of this disclosure, as demonstrated previously. This application is therefore intended to cover any variations, uses, or adaptations of the Narrow Window Magnetic Proximity Sensor using its general principles. Further, this application is intended to cover such departures from the present disclosure as come within known or customary practice in the art to which the disclosure pertains and which fall within the limits of the appended claims.

REFERENCE NUMBER LISTING

| | |
|---|---|
| 10 | Target magnet |
| 12 | Magnetic field |
| 14 | Streamlines/magnetic vector direction |
| 16 | Magnetic field (Bm) strength (in Gauss "G" $\times 10^3$) |
| 20 | Isomagnetic field intensity lines or gradations in the normal vector direction |
| 22 | Magnetic field (By) strength in the normal vector direction (in Gauss "G" $\times 10^3$) |
| 24 | Normal field vector direction |
| 26 | Wide switching window |
| 28 | Isomagnetic field intensity lines in the transverse vector direction |
| 30 | Magnetic field (By) strength in the transverse vector direction (in Gauss "G" $\times 10^3$) |
| 32 | Transverse field vector direction |
| 34 | Narrow switching window |
| 36 | Round "button" magnet |
| 38 | Positive pole face |
| 40 | Negative pole face |
| 42 | Hall Effect sensor |
| 44 | Travel direction |
| 46 | Fixed air gap |
| 48 | Area of magnetic field strength exceeding pertinent switching range |
| 50 | Two dimensional field plot |
| 52 | Normal field line |
| 54 | Transverse field line |
| 56 | Distance X axis (in) |
| 58 | Field Strength Y axis (G) |
| 60 | Normal magnetic field vector sensing element switching window |
| 62 | Normal magnetic field vector sensing element sensing thresholds |
| 64 | Transverse magnetic field vector sensing element switching window |
| 66 | Absolute transverse magnetic field vector sensing element sensing thresholds |
| 80 | Magnetic proximity sensor |
| 82 | Printed circuit board (PCB) |
| 84 | Top side |
| 86 | Bottom side |
| 88 | Normal magnetic field vector sensing element |
| 90 | Transverse magnetic field vector sensing element |
| 92 | Voltage regulation and protection circuit |
| 94 | Filtering circuit |
| 96 | Logic circuit |
| 100 | Logic diagram |
| 102 | Normal magnetic field vector sensing element |
| 104 | Normal magnetic field vector sensing element output |
| 106 | Transverse magnetic field vector sensing element |
| 108 | Transverse magnetic field vector sensing element output |
| 110 | Inverter/NOT gate |
| 112 | Inverter/NOT gate input |
| 114 | Inverter/NOT gate output |
| 116 | AND gate |
| 118 | AND gate first input |
| 120 | AND gate second input |
| 122 | AND gate output |
| 150 | First voltage regulator |
| 152 | First filter circuit |
| 154 | Second voltage regulator |
| 156 | Second filter circuit |
| 158 | Open collector output |
| 160 | Output |
| 162 | Transistor switch |
| 164 | Light Emitting Diode (LED) |
| 166 | Third voltage regulator |

What is claimed is:

1. A magnetic proximity sensor, comprising:
   a normal magnetic field vector sensing element oriented to detect the magnetic field strength of a target magnet in a normal field vector direction;
   at least one transverse magnetic field vector sensing element oriented to detect the magnetic field strength of the target magnet in at least one transverse field vector direction;

a logic circuit connected to the normal magnetic field vector sensing element and to the at least one transverse magnetic field vector sensing element, the logic circuit being configured to indicate when both the magnetic field strength of the target magnet in the normal field vector direction is greater than a normal magnetic field vector sensing threshold and the magnetic field strength of the target magnet in the at least one transverse field vector direction is lesser than an absolute transverse magnetic field vector sensing threshold, wherein at least one of the normal magnetic field vector sensing element detecting the magnetic field strength of the target magnet in a normal field vector direction and the at least one transverse magnetic field vector sensing element detecting the magnetic field strength of the target magnet in the at least one transverse field vector direction by way of at least one of the hall effect and magneto resistivity;

a first region adjacent to the target magnet wherein the magnetic field strength of the target magnet in the normal field vector direction sensed by the normal magnetic field vector sensing element is greater than the normal magnetic field vector sensing threshold defining a normal magnetic field vector sensing element switching window; and a second region adjacent to the target magnet wherein the magnetic field strength of the target magnet in the at least one transverse field vector direction sensed by the at least one transverse magnetic field vector sensing element is lesser than the absolute transverse magnetic field vector sensing threshold defining at least one transverse magnetic field vector sensing element switching window.

2. The magnetic proximity sensor of claim 1, wherein:
the normal magnetic field vector sensing element is configured to output a "high" or "on" signal when the magnetic field strength of the target magnet in the normal field vector direction sensed by the normal magnetic field vector sensing element is greater than the normal magnetic field vector sensing threshold;
the at least one transverse magnetic field vector sensing element is configured to output a "low" or "off" signal when the magnetic field strength of the target magnet in the at least one transverse field vector direction sensed by the at least one transverse magnetic field vector sensing element is lesser than the absolute transverse magnetic field vector sensing threshold;
an inverter/NOT gate is in electrical communication with the at least one transverse magnetic field vector sensing element, the inverter/NOT gate being configured to output a "high" or "on" signal when the at least one transverse magnetic field vector sensing element outputs a "low" or "off" signal; and
an AND gate is in electrical communication with the normal magnetic field vector sensing element and with the inverter/NOT gate, the AND gate configured to output a "high" or "on" signal only when the normal magnetic field vector sensing element outputs a "high" or "on" signal and the inverter/NOT gate outputs a "high" or "on" signal.

3. The magnetic proximity sensor of claim 1, wherein:
the logic circuit being further configured to determine from a rate of change of the magnetic field strength of the target magnet in the normal field vector direction sensed by the normal magnetic field vector sensing element whether the normal magnetic field vector sensing element is approaching the normal magnetic field vector sensing element switching window.

4. The magnetic proximity sensor of claim 1, wherein:
the logic circuit being further configured to determine from a rate of change of the magnetic field strength of the target magnet in the at least one transverse field vector direction sensed by the at least one transverse magnetic field vector sensing element whether the at least one transverse magnetic field vector sensing element is approaching the at least one transverse magnetic field vector sensing element switching window.

5. The magnetic proximity sensor of claim 1, wherein:
at least one of the normal magnetic field vector sensing threshold and the absolute transverse magnetic field vector sensing threshold being adjustable.

6. The magnetic proximity sensor of claim 1, wherein:
the absolute transverse magnetic field vector sensing threshold being 20 Gauss.

7. The magnetic proximity sensor of claim 1, further comprising:
a printed circuit board, the normal magnetic field vector sensing element being attached to a bottom side of the printed circuit board, and the at least one transverse magnetic field vector sensing element being attached to a top side of the printed circuit board.

8. An apparatus having a magnetic proximity sensor, comprising:
a target magnet attached to a movable object;
a normal magnetic field vector sensing element oriented to detect the magnetic field strength of the target magnet in a normal field vector direction;
at least one transverse magnetic field vector sensing element oriented to detect the magnetic field strength of the target magnet in at least one transverse field vector direction;
a logic circuit connected to the normal magnetic field vector sensing element and to the at least one transverse magnetic field vector sensing element, the logic circuit being configured to indicate when both the magnetic field strength of the target magnet in the normal field vector direction is greater than a normal magnetic field vector sensing threshold and the magnetic field strength of the target magnet in the at least one transverse field vector direction is lesser than an absolute transverse magnetic field vector sensing threshold, wherein;

at least one of the normal magnetic field vector sensing element detecting the magnetic field strength of the target magnet in a normal field vector direction and the at least one transverse magnetic field vector sensing element detecting the magnetic field strength of the target magnet in the at least one transverse field vector direction by way of at least one of the hall effect and magneto resistivity;

a first region adjacent to the target magnet wherein the magnetic field strength of the target magnet in the normal field vector direction sensed by the normal magnetic field vector sensing element is greater than the normal magnetic field vector sensing threshold defining a normal magnetic field vector sensing element switching window; and a second region adjacent to the target magnet wherein the magnetic field strength of the target magnet in the at least one transverse field vector direction sensed by the at least one transverse magnetic field vector sensing element is lesser than the absolute transverse magnetic field vector sensing threshold defining at least one transverse magnetic field vector sensing element switching window.

9. The apparatus of claim 8, wherein:
the normal magnetic field vector sensing element is configured to output a "high" or "on" signal when the magnetic field strength of the target magnet in the normal field vector direction sensed by the normal magnetic field vector sensing element is greater than the normal magnetic field vector sensing threshold;
the at least one transverse magnetic field vector sensing element is configured to output a "low" or "off" signal when the magnetic field strength of the target magnet in the at least one transverse field vector direction sensed by the at least one transverse magnetic field vector sensing element is lesser than the absolute transverse magnetic field vector sensing threshold;
an inverter/NOT gate is in electrical communication with the at least one transverse magnetic field vector sensing element, the inverter/NOT gate being configured to output a "high" or "on" signal when the at least one transverse magnetic field vector sensing element outputs a "low" or "off" signal; and
an AND gate is in electrical communication with the normal magnetic field vector sensing element and with the inverter/NOT gate, the AND gate configured to output a "high" or "on" signal only when the normal magnetic field vector sensing element outputs a "high" or "on" signal and the inverter/NOT gate outputs a "high" or "on" signal.

10. The apparatus of claim 8, wherein:
at least one of the normal magnetic field vector sensing threshold and the absolute transverse magnetic field vector sensing threshold being adjustable.

11. The apparatus of claim 8, wherein:
the absolute transverse magnetic field vector sensing threshold being 20 Gauss.

12. The apparatus of claim 8, further comprising:
a printed circuit board, the normal magnetic field vector sensing element being attached to a bottom side of the printed circuit board, and the at least one transverse magnetic field vector sensing element being attached to a top side of the printed circuit board.

13. A method of determining the proximity of an object to a sensor, comprising the steps of:
attaching a target magnet to the object;
orienting a normal magnetic field vector sensing element to detect the magnetic field strength of the target magnet in a normal field vector direction using at least one of the Hall Effect and magneto resistivity;
orienting a transverse magnetic field vector sensing element to detect the magnetic field strength of the target magnet in a transverse field vector direction using at least one of the Hall Effect and magneto resistivity;
connecting a logic circuit to the normal magnetic field vector sensing element and to the transverse magnetic field vector sensing element;
configuring the logic circuit to indicate when both the magnetic field strength of the target magnet in the normal field vector direction is greater than a normal magnetic field vector sensing threshold and the magnetic field strength of the target magnet in the transverse field vector direction is lesser than an absolute transverse magnetic field vector sensing threshold;
defining a first region adjacent to the target magnet wherein the magnetic field strength of the target magnet in the normal field vector direction sensed by the normal magnetic field vector sensing element is greater than the normal magnetic field vector sensing threshold as a normal magnetic field vector sensing element switching window; and
defining a second region adjacent to the target magnet wherein the magnetic field strength of the target magnet in the transverse field vector direction sensed by the transverse magnetic field vector sensing element is lesser than the absolute transverse magnetic field vector sensing threshold as a transverse magnetic field vector sensing element switching window.

14. The method of claim 13, further comprising the steps of:
configuring the normal magnetic field vector sensing element to output a "high" or "on" signal when the magnetic field strength of the target magnet in the normal field vector direction sensed by the normal magnetic field vector sensing element is greater than the normal magnetic field vector sensing threshold;
configuring the transverse magnetic field vector sensing element to output a "low" or "off" signal when the magnetic field strength of the target magnet in the transverse field vector direction sensed by the transverse magnetic field vector sensing element is lesser than the absolute transverse magnetic field vector sensing threshold;
configuring an inverter/NOT gate in electrical communication with the transverse magnetic field vector sensing element to output a "high" or "on" signal when the transverse magnetic field vector sensing element outputs a "low" or "off" signal; and
configuring an AND gate in electrical communication with the normal magnetic field vector sensing element and with the inverter/NOT gate to output a "high" or "on" signal only when the normal magnetic field vector sensing element outputs a "high" or "on" signal and the inverter/NOT gate outputs a "high" or "on" signal.

15. The method of claim 13, further comprising the steps of:
attaching the normal magnetic field vector sensing element to a bottom side of a printed circuit board, and attaching the transverse magnetic field vector sensing element to a top side of the printed circuit board.

* * * * *